United States Patent

Falls

[11] Patent Number: 5,460,418
[45] Date of Patent: Oct. 24, 1995

[54] SHACKLE BOLT SAFETY RETAINER

[76] Inventor: Elwood S. Falls, 3813 Bennett Dr., Pasadena, Tex. 77503

[21] Appl. No.: 165,188

[22] Filed: Dec. 13, 1993

[51] Int. Cl.⁶ .............................. E05B 39/02; F16G 13/00
[52] U.S. Cl. .............................. 292/329; 59/86; 411/120; 411/317; 411/965
[58] Field of Search ..................... 292/329, 327, 292/307 B, 317, 328; 59/86; 411/168, 998, 993, 965, 120, 121, 131, 124, 371, 85, 316, 317

[56] References Cited

U.S. PATENT DOCUMENTS

| | | | |
|---|---|---|---|
| 696,383 | 3/1902 | Tyden | 292/307 B |
| 1,273,689 | 7/1918 | Thomas | 59/86 |
| 1,346,907 | 7/1920 | Manson | 411/120 |
| 2,097,465 | 11/1937 | Morrison | 59/86 |
| 2,642,109 | 6/1953 | Hollerith | 411/131 |
| 3,101,641 | 8/1963 | Walker et al. | 411/999 X |
| 4,095,416 | 6/1978 | Issard | 59/86 |
| 4,221,252 | 9/1980 | Bruce | 411/317 |
| 4,278,120 | 7/1981 | Hart et al. | 411/317 X |
| 4,476,673 | 10/1984 | Brown | 411/317 X |
| 4,759,177 | 7/1988 | Brazell | 411/317 X |

FOREIGN PATENT DOCUMENTS

| | | | |
|---|---|---|---|
| 2228397 | 11/1974 | France | 59/86 |
| 608512 | 1/1935 | Germany | 59/86 |
| 29968 | 12/1910 | United Kingdom | 292/307 R |
| 1429235 | 3/1976 | United Kingdom | 292/307 R |

Primary Examiner—Rodney M. Lindsey
Attorney, Agent, or Firm—Bill B. Berryhill

[57] ABSTRACT

A safety retainer for preventing disengagement of a shackle bolt from a U-shaped shackle. The retainer includes a collar member and a pin member. The tubular collar member surrounds the head of the shackle bolt and is provided with a pair of holes through its walls, coaxially alignable with an aperture in the shackle bolt head, and a notch cut out of the wall of one end thereof for engagement with one arm of the shackle. The pin member is insertable through the pair of collar member holes and the shackle bolt aperture to prevent rotation and disengagement of the shackle bolt from the shackle.

6 Claims, 1 Drawing Sheet

U.S. Patent  Oct. 24, 1995  5,460,418
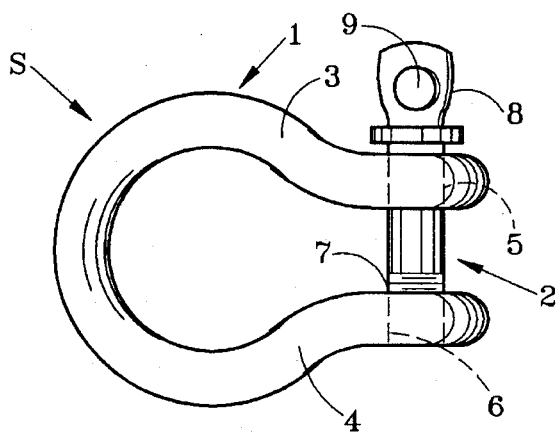
FIG. 1
(PRIOR ART)
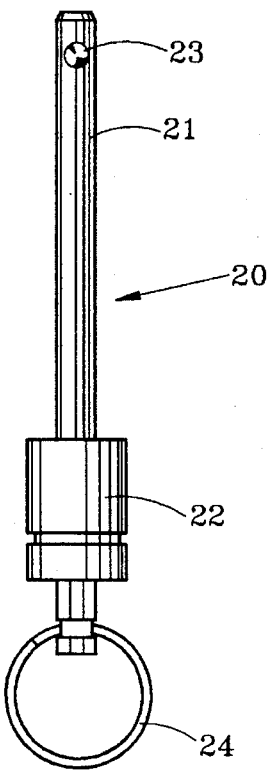
FIG. 4
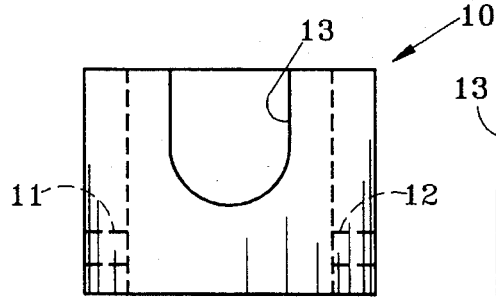
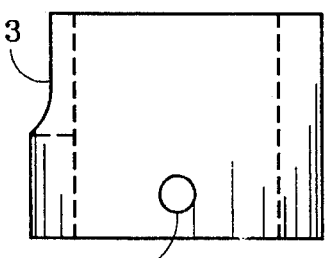
FIG. 2   FIG. 3
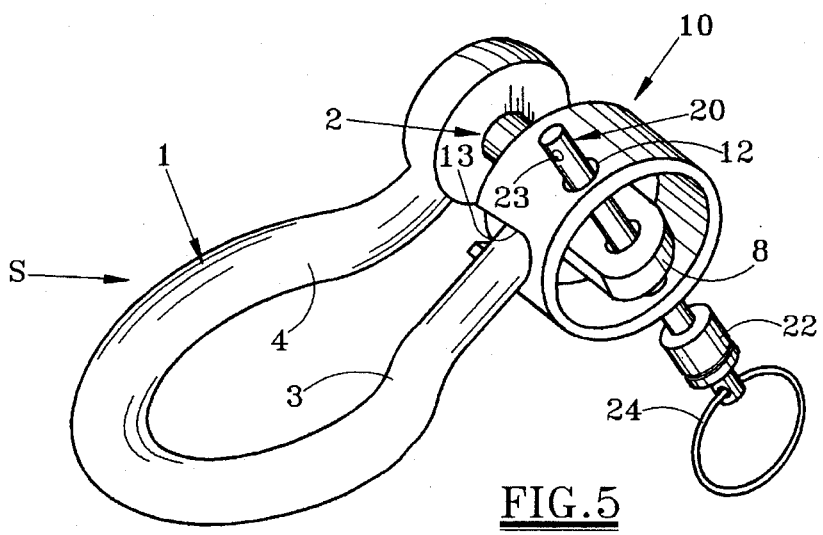
FIG. 5

5,460,418

SHACKLE BOLT SAFETY RETAINER

BACKGROUND OF THE INVENTION

1. Field of the Invention

The present invention pertains to fastening devices. More specifically, the present invention pertains to shackle type fastening devices and safety arrangements therefor.

2. Description of the Prior Art

A shackle is a U-shaped fastening device secured by a bolt or pin through holes in the end of the two arms of the U-shaped member. If a bolt is used, the bolt is typically threaded for engagement with corresponding threads in one of the arm holes or with a separate nut. In use, the bolt or pin is at least partially disengaged from the arm holes to allow insertion of another connecting member into the space between the arms. Then the bolt or pin is fully engaged to secure the connection. Such shackle arrangements are typically used to connect chains, cables, ropes, etc. to various loads and/or other connecting members.

Shackles are frequently used in heavy lifting with cranes, hoists, etc., especially in heavy construction or similar uses. Thus, it is very important that the shackle pin or bolt remain fully engaged to prevent accidental dropping of loads or severing of other connections. Due to the rather course threads associated with shackle bolts, such bolts may be easily backed off or unthreaded, unfastening such a connection and resulting in accidental property damage or, more importantly, bodily injury or death to people nearby. For this reason, the shackle bolt or pin is typically secured by a wire to prevent its disengagement. Such wiring is time consuming and fraught with danger if the wire is not properly secured or if it is not strong enough or if it has been used and bent to such an extent that the wire fails from fatigue. Obviously, safer means of retaining the shackle bolt are needed.

SUMMARY OF THE PRESENT INVENTION

The present invention provides a safety retainer for preventing the backing off or disengagement of a shackle bolt from its U-shaped shackle. The safety retainer of the present invention includes a tubular collar member for surrounding the shackle bolt head when the bolt is fully engaged. The collar member has a pair of holes through opposing walls thereof which are coaxially alignable with an aperture through the shackle bolt head and is provided with a notch cut out of the wall at one end thereof for engagement with at least one of the shackle arms. A pin member is provided for insertion through the pair of collar member holes and the bolt head aperture preventing rotation of the shackle bolt and disengagement thereof from the shackle. In a preferred embodiment of the invention, one end of the pin member is enlarged to prevent complete passage through the pair of collar member holes and the other end of the pin member is provided with a detent which allow the pin to be inserted through the collar member holes but prevents accidental removal of the pin member therefrom.

The safety retainer of the present invention is easy to install, a collar member being placed over the shackle bolt head with a notch thereof engaging one of the shackle arms. The pin member is then inserted through the coaxially aligned collar member holes and the bolt head aperture to secure the connection. When it is desired to release the connection, the pin member is simply pulled out, the collar member removed to allow rotation of the shackle bolt. This arrangement is easy to use and much less time consuming than wiring or other methods of the prior art. Furthermore, and most importantly, this arrangement is much safer than the retaining methods of the prior art. Many other objects and advantages of the invention will be apparent from reading the description which follows in conjunction with the accompanying drawings.

BRIEF DESCRIPTION OF THE DRAWINGS

FIG. 1 is a plan view of a shackle fastening device, utilizing a shackle and shackle bolt according to the prior art;

FIG. 2 is a longitudinal view of a retainer collar which makes up a portion of the shackle bolt safety retainer of the present invention, according to a preferred embodiment thereof;

FIG. 3 is a longitudinal view of the collar member of FIG. 2, rotated ninety degrees about its axis;

FIG. 4 is a longitudinal view of a pin member for use with the collar member of FIGS. 2 and 3 in providing the safety retainer of the present invention, according to a preferred embodiment thereof; and FIG. 5 is a perspective view of a shackle fastening device, such as the one shown in FIG. 1, in combination with the safety retainer of the present invention, according to a preferred embodiment thereof.

DESCRIPTION OF A PREFERRED EMBODIMENT OF THE INVENTION

Referring first to FIG. 1, there is shown a shackle fastening device S comprising a U-shaped shackle 1 and a shackle bolt 2. The shackle 1 is typically of a strong metallic material and bent in a U-shape to provide arms 3 and 4 with a space 5 therebetween. The ends of the arms 3 and 4 are typically provided with coaxially aligned holes 5 and 6 for engagement by the bolt 2. The bolt 2 may be threaded, as at 7, for threaded engagement with corresponding threads in the hole 6. The bolt 2 may be provided with a head 8 by which the bolt 2 may be rotated for threaded engagement or disengagement with the threaded hole 6. Typically, the bolt head 8 may have an aperture 9 therethrough. Such an aperture is required with the present invention.

Referring now to FIGS. 2 and 3, there is shown a tubular collar member 10 which is one of the members of the safety retainer of the present invention. The collar member 10 is provided with a pair of coaxially aligned holes 11,12 through opposing walls thereof. In addition, an open ended notch 13 is cut out of the wall of one end of the collar. The width of the notch 13 is slightly greater than the width of the arm 3 which it will engage. The depth of the notch 13 is preferably no greater than the thickness of the shackle arm 3.

Referring now to FIG. 4, there is shown an elongated pin member 20, the major portion 21 of which is of a diameter just slightly less than the diameter of the collar holes 11 and 12 so as to allow insertion therethrough. One end of the pin member 20 has an enlarged portion 22 to prevent complete passage of the pin member 20 through the collar member holes 11,12. The opposite end of the pin member 20 is provided with a spring loaded detent 23 which projects out of a hole provided in the pin member 21. The detent 23 may be forced radially inwardly upon engagement of the pin member 21 with the holes 11 and 12 of collar member 10 to allow such insertion. A ring member 24 may be provided to facilitate handling of the pin member 20.

Referring now also to FIG. 5, the shackle member S is shown with the shackle bolt 2 in the fully engaged position. The collar member 10 is placed so that it surrounds the shackle bolt head 8 with its holes 11 and 12 coaxially aligned with the aperture 9 through the shackle bolt head 8 and the notch 13 engaging the shackle arm 3. Then the pin 20 is inserted through holes 11 and 12 and the aperture 9 of the bolt head 8 to assume the position shown in FIG. 5. The spring loaded detent 23 assures this engagement is maintained as long as needed.

Since the notch 13 is engaging the arm 3 of the shackle S, the tubular member 10 is prevented from rotating, relative to the shackle S and since the pin 20 is inserted through holes 11 and 12 of the collar 10 and the aperture 9 of the bolt head 8, rotation of the shackle bolt 2 is also prevented. Thus the shackle connection is held in complete engagement and prevented from disengagement as long as desired. To release the connection, a force must be applied to the pin 20 by pulling on the ring 24, forcing the detent 23 inwardly and allowing the pin 20 to be removed. This allows removal of the tubular collar 10 and then disengaging rotation of the shackle bolt 2.

Thus, the safety retainer of the present invention is time efficient and safe. It is a great improvement over the means of securing shackle connections of the prior art. A single embodiment of the invention has been described herein. However, many variations thereof can be made without departing from the spirit of the invention. Accordingly, it is intended that the scope of the invention be limited only by the claims which follow.

I claim:

1. A safety retainer for preventing disengagement of a shackle bolt from a generally U-shaped shackle the arms of which are provided near the ends thereof with coaxially aligned holes for engagement by said bolt, said bolt being provided with threads for threaded engagement with corresponding threads provided in at least one of said holes and having a head at one end thereof by which said bolt is rotated for said threaded engagement with said hole threads, said head having an aperture therethrough, said safety retainer comprising:

a tubular collar member for surrounding said shackle bolt head and having a pair of holes through opposing walls thereof which are coaxially alignable with said shackle bolt head aperture and having a notch cut out of a wall of an end thereof for engagement with at least one of said shackle arms to prevent rotation of said collar member; and a pin member insertable through said pair of collar member holes and said bolt head aperture to prevent rotation and disengagement of said shackle bolt from said shackle.

2. The safety retainer of claim 1 in which said pin member has an enlarged end to prevent complete passage through said pair of collar member holes.

3. The safety retainer of claim 2 in which said pin member is provided with a detent at an end opposite said enlarged end which allows said pin to be inserted through said collar member holes but prevents accidental removal of said pin member therefrom.

4. The safety retainer of claim 2 in which said enlarged end of said pin member is provided with a ring member to facilitate handling of said pin member.

5. The safety retainer of claim 1 in which the length of said notch is no greater than the thickness of the shackle arm which it engages, preventing interference of said safety retainer with the area between said shackle arms.

6. The safety retainer of claim 5 in which the diameter of said pair of holes in said collar member is no greater than the width of said shackle bolt head aperture.

* * * * *